Aug. 25, 1931. H. HUBBELL, JR 1,820,193
DEVICE FOR ROLLING SCREW THREADS
Filed Jan. 12, 1927
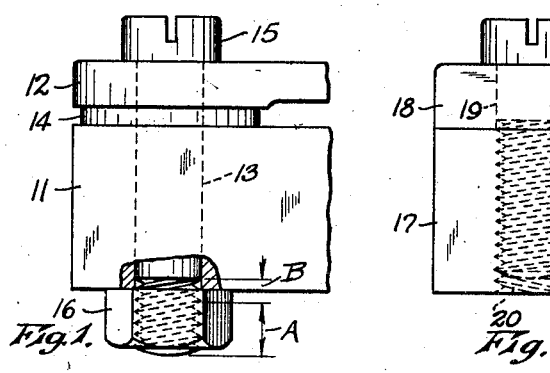
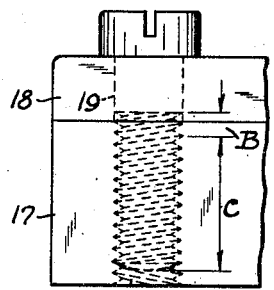
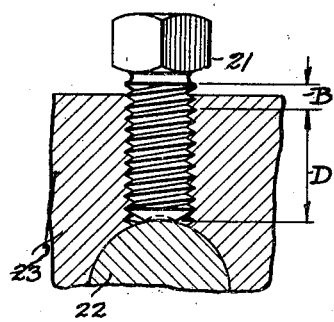
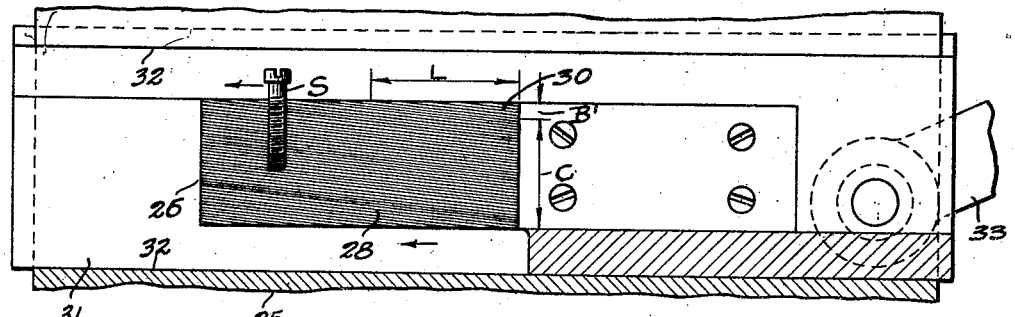
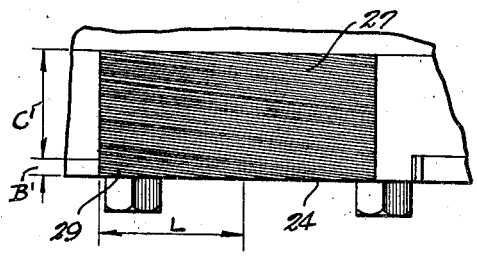
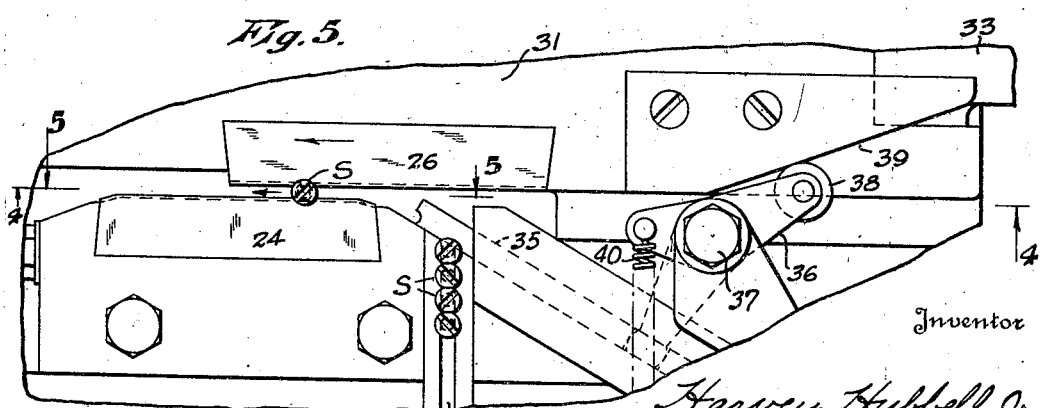

Patented Aug. 25, 1931

1,820,193

UNITED STATES PATENT OFFICE

HARVEY HUBBELL, JR., OF BRIDGEPORT, CONNECTICUT, ASSIGNOR TO HARVEY HUBBELL, INCORPORATED, OF BRIDGEPORT, CONNECTICUT, A CORPORATION OF CONNECTICUT

DEVICE FOR ROLLING SCREW THREADS

Application filed January 12, 1927. Serial No. 160,627.

This invention relates to a device for rolling screw threads, and particularly to a device for rolling the type of locking thread described and claimed in my copending application for self locking screw, filed of even date herewith, Serial No. 160,628. In the said copending application I have described a bolt or screw having a novel thread which will automatically tend to lock or secure the nut of the bolt or the screw from loosening in use.

In the prior devices for securing this effect of which I am aware the threads are difficult and expensive to make and also after once being used are so broken or destroyed that they cannot be used to give the same locking effect a second time. I have produced a novel thread which will produce this desired locking effect, and have also devised a device by which this novel thread may be formed by a simple rolling operation and with no greater expense than the rolling of the standard uniform thread. I have provided a screw which has a simple thread easily manufactured by rolling between two relatively movable dies, and in which the thread when the parts are tightened is not destroyed, and therefore, the screw may be used a number of times without destroying the automatic locking effect. I secure this desirable result by threading the screw for the greater portion of its length, which is to be threaded into a tapped opening in another element, with a thread of a uniform pitch corresponding to the pitch of the thread in the tapped opening, and then at the inner end of this first thread forming for a relatively short distance another thread of a uniform pitch, but of a different pitch from that of the first thread on the screw and the thread of the tapped opening, so that when the screw is threaded into the tapped opening it will thread into this opening as does the ordinary screw up until the screw or nut is nearly set, and then during the last few turns the thread of the different pitch from that of the tapped opening will be forced into the opening and because of its difference in pitch will securely bind the two sets of threads on the screw against the threads of the tapped opening, forming a high resistance to the loosening of the screw or nut which is sufficient to prevent their loosening up in normal operation.

In the drawings, I have shown several types of screws using this novel thread as disclosed in said copending application, and also showing the dies for forming this thread and the method of using the same. In the drawings, Fig. 1 is a side elevation of two elements secured together by means of a bolt embodying my novel thread.

Fig. 2 is a similar view showing two elements secured together by a machine screw having this thread.

Fig. 3 is a section of a member carrying a shaft or rod which is secured by a set screw having this thread, the set screw being shown in elevation.

Fig. 4 is a longitudinal vertical section through a portion of a thread rolling machine taken substantially on line 4—4 of Fig. 6, and showing the movable die in elevation.

Fig. 5 shows the opposed face of the stationary die but with the die upside down and looking in the direction of the arrows 5—5 of Fig. 6, and Fig. 6 is a top plan view of the thread rolling machine showing the use of these dies.

Referring to Fig. 1, I have shown the invention as applied to a bolt 13 used to secure together two members 11 and 12 and there is shown a washer 14 between the two members. This bolt may have any type of head 15 and at its opposite end is threaded for a distance indicated at (A) somewhat less than the thickness of the nut 16 with which it is to be used, and this thread (A) is of a uniform pitch and of the same pitch as the thread in the tapped opening in the nut. The last few turns, however, of the thread at the inner end of the thread (A), as indicated at (B), forms a continuation of the thread (A) but is of a slightly different pitch than the thread (A). It may be of a pitch requiring a greater or less number of threads per inch than the thread (A), but is preferably of a slightly larger number as in this case the angle of inclination of the thread (B) with respect to the axis of the bolt is somewhat less than that of the thread (A), and therefore, when the nut is tightened has a somewhat greater camming action and holds better than where the angle is greater. The thread (B) is located at the inner end of the thread (A) and is so arranged or spaced from the head 15 that when the nut is tightened a few of the threads (B) will extend into the nut and as this thread is of a different pitch than the thread of the tapped opening in the nut the nut will tend to move at a different speed on this thread than it does on the thread (A) and will, therefore, cause a binding action between the threads (A) and (B) and the tapped thread in the nut, which will be very tight and will offer great resistance to loosening or turning of the nut in the opposite direction, and therefore, when the nut is once tightened these threads will resist loosening of this nut. However, this tightening operation, unless the metal of the parts is soft, will not so distort the threads or ruin them sufficiently to prevent the same binding operation after the bolt has been used and again tightened. As a matter of fact, with the metals ordinarily used this operation may be performed several times without so wearing or distorting the threads as to prevent this binding operation.

In the form shown in Fig. 2 the members 17 and 18 are secured together by the machine screw 19. In this arrangement the member 17 has a tapped opening 20 therein and the body of the screw is threaded for a distance indicated at (C) with a thread having a pitch corresponding to the pitch of the tapped opening, while at the inner end of this threaded portion there is a thread (B) of a few turns of a slightly different pitch from that of the thread (C) and that of the tapped opening. This thread (B) is so arranged as to be a continuation of the thread (C) and to thread into the tapped opening during the last few turns of the screw during the tightening operation. As the thread (B) is of a different pitch than the thread (C) and the thread of the tapped opening it will cause a binding action between the threads on the screw and those in the tapped opening to resist turning backward or loosening of the screw during use, the same as in the form shown in Fig. 1.

In Fig. 3 I have shown the same idea as applied to a set screw 21 used to clamp a shaft or rod 22 in an opening in a member 23. This member has a tapped opening and the set screw is threaded for a portion (D) with a thread corresponding in pitch to that of the tapped opening, it being understood that these threads are of uniform pitch throughout. Adjacent the outer end or head there is a thread of a few turns (B) of a uniform pitch but slightly different from that of the pitch of the thread (D) and the thread of the tapped opening, the same as in the first two forms of Figs. 1 and 2, and this thread (B) is so located as to extend into the tapped opening during the last few turns of the set screw in tightening it against the member 22. This thread (B) being of a different pitch than the thread (D) and that of the tapped opening gives the binding action of the threads to resist loosening of the screw the same as in the first forms.

It is preferred that in the different forms the short thread (B) be only a slight change in pitch from the longer portion of the thread, as indicated at (A), (C) or (D). I have found that a convenient and satisfactory change is to make the thread (B) of a pitch requiring one more thread per inch than that of the thread (A), (C) or (D). For instance, if the threads (A), (C) or (D) are of a pitch requiring twenty-four threads per inch the thread (B) may be made of a pitch requiring twenty-five threads per inch. On larger threads the change may be even less.

As the threads (A), (C) and (D) are of uniform pitch throughout and as the thread (B) is also of a uniform pitch and a continuation of the thread (A), (C) or (D), these threads may be rolled in the standard type of thread rolling machine between a stationary die and a reciprocating die with no more trouble or expense in the rolling operation than is required for rolling an ordinary uniform thread. Referring to Figs. 4 to 6 is shown parts of a thread rolling machine and also dies for rolling these threads. A stationary die is indicated at 24 mounted by any suitable means on the bed or frame 25 of the machine. The front face of this die is shown in Fig. 5, but the die is shown in this figure as being upside down because in normal operation, as indicated in Fig. 6, it will be arranged so that the face shown in Fig. 5 will be opposed to the face of the movable die 26 shown in Fig. 4. The dies are arranged a suitable distance apart as shown in Fig. 6, depending on the diameter of the screw to be rolled, and on their opposed faces are provided with oppositely inclined grooves and ridges 27 and 28 corresponding to the shape of the threads to be rolled. To roll the thread of different pitch (B) on the screws the stationary die 24 is provided at its upper side edge adjacent its outer end, or that is, the end at which the screw leaves the die, with grooves and ridges 29 corresponding to the pitch of the thread (B) while the remainder of the die is provided with grooves and ridges 27 corresponding to the threads (A), (C) or (D). The number of turns of the thread (B) may be anything found desirable but normally only a few turns are required and these are indicated at 29 (Fig. 5) and extend as indicated by the lines (B') and (L). The corresponding ribs and grooves on the reciprocating or movable die 26 to cooperate with these ridges and grooves 28 on the stationary die to give the same thread, are formed at the upper rear end of the reciprocating die, as indicated at 30, in Fig. 4, and their extent is shown by the lines (B') and (L) in this figure. The movable die 26 is mounted on a suitable slide 31 mounted to reciprocate in suitable guideways 32 in the bed of the machine, and it is reciprocated by a link or connecting rod 33 connected to a rotary crank or suitable toggle mechanism. A feeding device for feeding the screws (S) between the dies is indicated in Fig. 6, the screw being fed by means of a chute 34 and fed one at a time between the dies by a reciprocating bar 35 operated by a lever 36 pivoted at 37. One end of the sleeve is connected to the bar 35 and the other end carries a roller 38 running on a cam surface 39 which is carried by the reciprocating slide 31. A spring 40 connected to a lever holds the roller against the cam surface and returns the feed bar 35 after it has been advanced by the cam. As the die 26 is moved forwardly or to the left, as indicated by the arrow in Fig. 6, it rolls the body of the screw (S) between the two opposed surfaces of the dies, the ridges 27, 28, 29 and 30 being inclined at an inclination corresponding to the angle of the thread to be rolled, and, of course, as these ridges are on opposite sides of the screw they are inclined in opposite directions. As the die 26 moves forwardly the screw is rolled along the face of the stationary die 24 to the left as viewed in Figs. 4 and 6. During the first part of this movement of the die as shown, the normal thread (A), (C) or (D) only will be formed in the screw, which is the thread formed by the ridges 27 and 28, but this rolling operation heats the metal and in reality causes it to flow, so that when the ridges and grooves 29 and 30 of the different pitch for the thread (B) run onto the screw the thread merely conforms to this slight change in pitch, and the screw leaves the dies with the two threads of different pitches formed as a continuous thread.

Having thus set forth the nature of my invention, what I claim is:

1. A screw thread rolling die comprising a block having in one face thereof a plurality of parallel inclined ribs to form threads in a screw rolled against them, said ribs being arranged in two separate groups with the ribs in one group arranged to form a thread of a different pitch from that formed by the other group, and the two groups being arranged side by side so as to act simultaneously on the bolt being threaded to form a continuous thread.

2. A screw thread rolling die comprising a block having in one face thereof a plurality of parallel inclined ribs to form a thread in a screw of a given pitch, and another set of a plurality of ribs arranged at one side of the first set and of a different spacing to simultaneously form a thread at the inner end of the first thread of a different and of a uniform pitch which is a continuation of the first thread.

3. A screw thread rolling die comprising a block having in one face thereof a plurality of parallel inclined ribs to form a thread in a screw of a given pitch, and another set of a plurality of ribs arranged at one side of the first set but of a different spacing from the ribs of the first set to form a thread which is a continuation of the first thread at the inner end thereof and of a different pitch from the first thread, said second group of ribs being separate and distinct from the first group.

4. A screw thread rolling die comprising a block having in one face thereof a plurality of parallel inclined ribs to form threads in a screw rolled against them, said ribs being arranged in two groups with the ribs in one group arranged to form a thread of a different pitch from that formed by the other group, the two groups being arranged side by side so as to act simultaneously on the bolt being threaded to form a continuous thread, the ribs of one group being shorter than the adjacent ribs of the other group so that the thread is formed for the entire threaded length of the bolt of the pitch corresponding to the second group and then a portion of this thread is shifted to a different pitch by the first group while the metal of the thread is in a flowing state.

5. In a screw thread rolling machine, a pair of relatively movable dies having oppositely inclined ribs on their opposed faces for forming the threads, and the ribs at one edge of the dies at their exit ends for the screw being arranged to reform a part of the first formed thread into a thread of a different pitch from the first thread formed by the remainder of the dies and forming a continuation of the remainder of the first formed thread.

6. In a screw thread rolling machine, a pair of relatively movable dies provided on their opposed faces with inclined ribs to form a thread of uniform pitch for the entire part of the threaded portion of a screw, said dies being also provided at their exit ends for the screw with similarly inclined ribs separate and distinct from the other ribs to reform a few threads of the first formed thread into threads of a uniform and slightly different pitch at the inner end of the remainder of the first formed thread and which is a continuation of the remainder of the first formed thread.

7. A screw thread rolling die comprising a block having in one face thereof a group of a plurality of parallel inclined ribs to form threads in a screw rolled against them, and an additional group of a plurality of differently spaced parallel inclined ribs, said additional group of ribs being arranged side by side with the first group whereby to reform a part of the thread formed by the first group into a thread of a slightly different pitch from that of the remainder of the thread formed by the first group and forming a continuation of said remainder.

8. A screw thread rolling die comprising a block having in one face thereof a plurality of parallel inclined ribs to form a thread in a screw of a given pitch, and another set of a plurality of ribs arranged at one side of the first set and of a different spacing to simultaneously reform a part of the inner end of the first thread into a thread of a different and uniform pitch which is a continuation of the remainder of the first thread.

In testimony whereof I affix my signature.

HARVEY HUBBELL, Jr.